U. LOBB.
DEVICE FOR REMOVING EYES FROM POTATOES, PINEAPPLES, &c.
APPLICATION FILED NOV. 9, 1910.
1,038,164.
Patented Sept. 10, 1912.
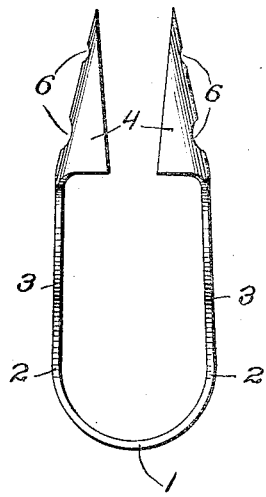
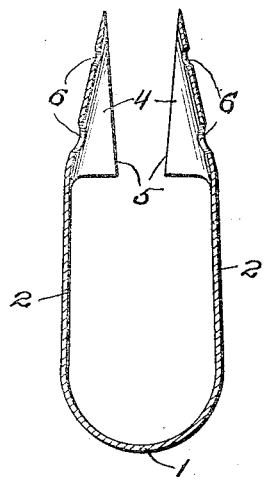
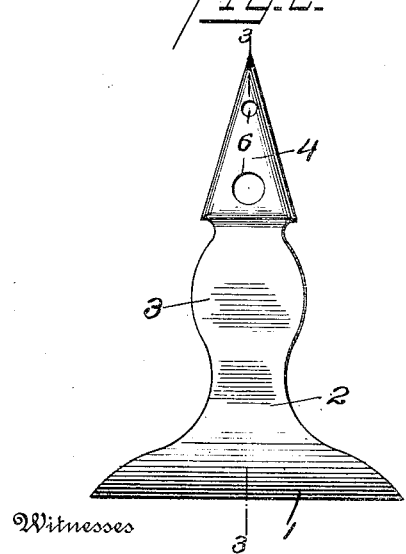
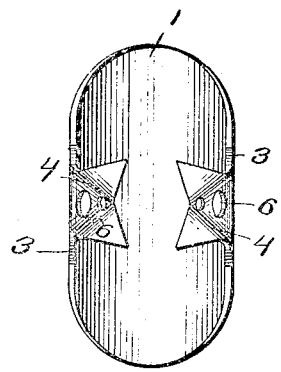
Witnesses
H. Strauss
R. S. V. Krenkel
Inventor
Una Lobb,
By Joshua R. H. Potts.
Attorney

UNITED STATES PATENT OFFICE.

UNA LOBB, OF PHILADELPHIA, PENNSYLVANIA.

DEVICE FOR REMOVING EYES FROM POTATOES, PINEAPPLES, &c.

1,038,164.      Specification of Letters Patent.      Patented Sept. 10, 1912.

Application filed November 9, 1910. Serial No. 591,413.

*To all whom it may concern:*

Be it known that I, UNA LOBB, a subject of the King of Great Britain, residing at Philadelphia, in the county of Philadelphia and State of Pennsylvania, have invented certain new and useful Improvements in Devices for Removing Eyes from Potatoes, Pineapples, and the Like, of which the following is a specification.

My invention relates to improvements in devices for removing eyes from potatoes, pineapples, and the like, the object of the invention being to provide a simple inexpensive construction adapted to be readily manipulated in the hand to easily and effectually remove eyes from potatoes, pineapples and the like, and which by the mere inward pressure on the device serves to draw the cutting ends together, and cut out the eye together with a conical portion of the potato or pineapple.

A further object is to provide a device of this character which is composed of a single piece of spring sheet metal stamped and bent in an improved manner rendering the device simple and inexpensive, yet strong and durable in use.

With these and other objects in view, the invention consists in certain novel features of construction and combinations and arrangements of parts, as will be more fully hereinafter described and pointed out in the claim.

In the accompanying drawings: Figure 1, is a edge view illustrating my improvements. Fig. 2, is a view in side elevation. Fig. 3, is a view in section on the line 3—3 of Fig. 2, and Fig. 4, is an end view.

My improved device is made from a single blank of spring sheet metal, the intermediate or central portion of which being extended transversely at both sides so as to form a grip or hand hold 1 when the device is bent, the said enlarged portion also constituting a spring, and assisting the arms 2 which extend from the edges of this enlarged portion, to maintain such arms in parallelism and return them to such position when permitted. Said arms 2 are enlarged between their ends forming finger holds 3 to facilitate the movement of the arms toward each other, and at the free ends of these arms integral semi-conical cutters 4, 4, are provided.

The inner edges 5 of these cutters 4 are sharpened and are so arranged that when the arms are pressed together these cutting edges come together in a line with the longitudinal center of the device, and when apart these cutting edges appear to flare outward from their inner to their outer ends.

The outer faces of said cutters, which are curved in cross section, taper inward from their inner to their outer ends constituting, in effect, cam faces which when the cutters are forced into the potato or pineapple cause the latter to exert a cam action on the cutters, forcing the latter toward each other as they are pressed into the potato or pineapple, and finally bringing said cutters together with the eye between them.

Moisture and superfluous potato or pineapple is permitted to escape through openings 6 in said cutters, affording the minimum of resistance to the movement of the cutters toward each other.

In operation, therefore, it is simply necessary for the operator to position the cutters at opposite sides of the eye, and then press said cutters into the potato or pineapple, when the cam action against the cutters will force the cutters together, completely cutting around the eye, and when the device is removed and the cutters separated by reason of the spring action of arms 2, and the handle portion 1, the potato eye is dropped from the device. Of course, the eye may be retained in the device as long as desired by simply maintaining a pressure on the arms, but the eye will be quickly dropped when the pressure is released. The operator holds the device in one hand with the thumb against the enlarged portion 3 of one arm, and one of the fingers against the enlarged portion 3 of the other arm, with the enlarged handle or grip portion in the palm of the hand, and this manner of holding the device enables the operator a free manipulation of the cutters in the operation of cutting out the eye.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

A device of the character described, comprising a single integral piece of spring sheet metal, bowed between its ends, enlarged transversely at its intermediate bowed portions to fit the palm of the hand, and enlarged between said bowed portions and its free ends to receive the thumb and fingers respectively, semi-conical cutters at the free ends of said device, said cutters having sharpened adjacent edges, the outer walls of said cutters inclining inwardly from their inner to their outer ends, and the members of said device which are formed by the bending positioned normally parallel between said cutters and said intermediate portion, substantially as described.

In testimony whereof I have signed my name to this specification in the presence of two subscribing witnesses.

UNA LOBB.

Witnesses:
R. H. KRENKEL,
C. E. POTTS.